United States Patent
Horman et al.

(10) Patent No.: US 8,862,930 B2
(45) Date of Patent: Oct. 14, 2014

(54) CRASH RECOVERY MEMORY RESERVATION BASED ON DEVICE DRIVERS FOR AN OPERATIONAL KERNEL

(75) Inventors: Neil R. T. Horman, Cary, NC (US); Vivek Goyal, Lowell, MA (US)

(73) Assignee: Red Hat, Inc., Raleigh, NC (US)

( * ) Notice: Subject to any disclaimer, the term of this patent is extended or adjusted under 35 U.S.C. 154(b) by 631 days.

(21) Appl. No.: 12/953,972

(22) Filed: Nov. 24, 2010

(65) Prior Publication Data

US 2012/0131380 A1 May 24, 2012

(51) Int. Cl.
G06F 11/00 (2006.01)
G06F 11/14 (2006.01)
G06F 11/34 (2006.01)

(52) U.S. Cl.
CPC ........ *G06F 11/1415* (2013.01); *G06F 11/1417* (2013.01); *G06F 11/3409* (2013.01)
USPC ................ 714/6.1; 714/36; 714/42; 711/150; 711/170

(58) Field of Classification Search
CPC . G06F 21/50; G06F 11/0706; G06F 11/0778; G06F 11/1415; G06F 11/1417
USPC .................. 714/36, 42, 6.1, 48; 711/150, 170
See application file for complete search history.

(56) References Cited

U.S. PATENT DOCUMENTS

| | | | |
|---|---|---|---|
| 5,790,777 A * | 8/1998 | Izuta et al. | 714/45 |
| 6,681,348 B1 * | 1/2004 | Vachon | 714/45 |
| 8,171,545 B1 * | 5/2012 | Cooley et al. | 726/22 |
| 8,407,761 B2 * | 3/2013 | Carter et al. | 726/2 |
| 2003/0084374 A1 * | 5/2003 | Chatterjee et al. | 714/33 |
| 2003/0172145 A1 * | 9/2003 | Nguyen | 709/223 |
| 2004/0123301 A1 * | 6/2004 | Collins et al. | 719/310 |
| 2005/0273476 A1 * | 12/2005 | Wertheimer et al. | 707/204 |
| 2007/0234366 A1 * | 10/2007 | Morich et al. | 718/104 |
| 2008/0209264 A1 * | 8/2008 | Morse et al. | 714/7 |
| 2009/0024820 A1 * | 1/2009 | Ponnuswamy | 711/170 |
| 2009/0044051 A1 * | 2/2009 | Nellitheertha | 714/19 |
| 2009/0063651 A1 * | 3/2009 | Brahmavar | 709/212 |
| 2009/0228743 A1 * | 9/2009 | Ponnuswamy | 714/48 |
| 2010/0031094 A1 * | 2/2010 | Komagome | 714/48 |
| 2010/0180066 A1 * | 7/2010 | Powell | 711/103 |
| 2011/0035618 A1 * | 2/2011 | Jann et al. | 714/3 |
| 2011/0225458 A1 * | 9/2011 | Zuo et al. | 714/37 |
| 2012/0005445 A1 * | 1/2012 | Escandell et al. | 711/170 |
| 2012/0124572 A1 * | 5/2012 | Cunningham et al. | 718/1 |
| 2012/0216054 A1 * | 8/2012 | Cho et al. | 713/300 |

* cited by examiner

*Primary Examiner* — Loan L. T. Truong
(74) *Attorney, Agent, or Firm* — Lowenstein Sandler LLP

(57) ABSTRACT

A computing system stores actual memory usage data in a user memory space. The actual memory usage data represents memory usage of a plurality of device drivers that are loaded by a first kernel. The computing system generates an estimate of memory space to be reserved for a second kernel based on the actual memory usage data for the plurality of device drivers that are loaded by the first kernel and reserves memory space for the second kernel using the estimate.

20 Claims, 4 Drawing Sheets

CRASH RECOVERY MEMORY RESERVATION BASED ON DEVICE DRIVERS FOR AN OPERATIONAL KERNEL

TECHNICAL FIELD

Embodiments of the present invention relate to reserving memory space. Specifically, embodiments of the present invention relate to reserving crash recovery memory space based on device driver memory usage of an operational kernel.

BACKGROUND

A computing system includes physical memory (main memory), that is mapped to virtual memory, which can be divided into regions, such as a user space and a kernel space. The user space is reserved for user mode programs. The kernel space is reserved for running an operating system, such as Linux® OS, SELinux OS, Windows® OS, etc. The kernel space can include a memory space for an operational kernel of the operating system and can include a private and protected region of memory space that is reserved for executing a new operating system for when an initial operating system crashes. When an initial operating system in the operational kernel experiences a system failure, a new operating system can be booted from a second kernel, also known as a crash kernel and/or a capture kernel, that resides in the reserved private region of memory space. Operating systems can provide a crash recovery mechanism that boots a crash kernel in a new operating system using the protected region of memory. The protected region of memory that stores the crash kernel is non-writable during operation of the initial operating system. When the initial operating system crashes, the new operating system can then reinitialize the computing system hardware without modifying the state of the crashed operating system memory. For example, the Linux® OS provides a crash recovery mechanism known as 'kdump' that executes from a new operating system and collects state data for the crashed operating system (the first operational kernel) for post-mortem analysis.

The booting of the second kernel requires, by definition, sufficient amount of memory space to boot from, and thus, the first operational kernel sets aside (reserves) memory for the second kernel. The reserved memory space for the second kernel is protected from general use and is not available during normal operation of the initial operating system. Typically, the size for the reserved memory space for the second kernel is significant in size, but can vary based on the system hardware configuration, and use. Some computing systems may require a very small amount of memory to boot the second kernel successfully, while others may require a very large amount of memory space for the second kernel. Conventional solutions, however, usually reserve the memory space for the second kernel using estimate memory requirements based on common configurations. Typically, a user, such as a system administrator, decides (estimates) the amount of memory to reserve for the second kernel and manually reserves the memory space for the second kernel. The user can estimate how much space to reserve based on a combination of a manufacturer recommendation, the system environment, and other factors. In some cases, the user elects to use a default size, such as 128 MB. As such, the selection of a memory size that is considered to be 'safe' for most system deployments is usually an over-estimation and can often be wasteful, especially on a computing system which is already memory constrained. However, a user's estimate of a memory size that is too small leads to the new operating system failing to capture the crash data (crash dump) due to insufficient memory space.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for automatically estimating crash memory space for a second kernel based on actual memory usage of a first kernel. In one embodiment, the system automatically reserves the crash memory space for the second kernel based on the estimate. A computing system stores actual memory usage data in a user memory space. The actual memory usage data represents memory usage of a plurality of device drivers that are loaded by a first kernel. The computing system generates an estimate of memory space to be reserved for a second kernel based on the actual memory usage data for the plurality of device drivers that are loaded by the first kernel and reserves memory space for the second kernel using the estimate.

Conventional solutions reserve memory space for a second kernel (also known as crash kernel and/or capture kernel) using estimate memory requirements based on common configurations. Typically, a system administrator, estimates the amount of memory to reserve for the second kernel based on a combination of a manufacturer recommendation, the system environment, and other factors, and manually reserves the memory space for the second kernel. The amount of memory reserved by the user can often be too large and thus, wasteful, especially on a computing system which is already memory constrained (e.g., desktop or laptop having a 1 Gb RAM system, mobile device, smart phone, etc.). However, a user's estimate of a memory size that is too small leads to the new operating system failing to capture the crash data (crash dump) due to insufficient memory space. Embodiments of the invention can determine a more accurate size of memory to reserve for the second kernel based on the actual memory usage, for example, of device drivers, in the first kernel.

Figure 1:
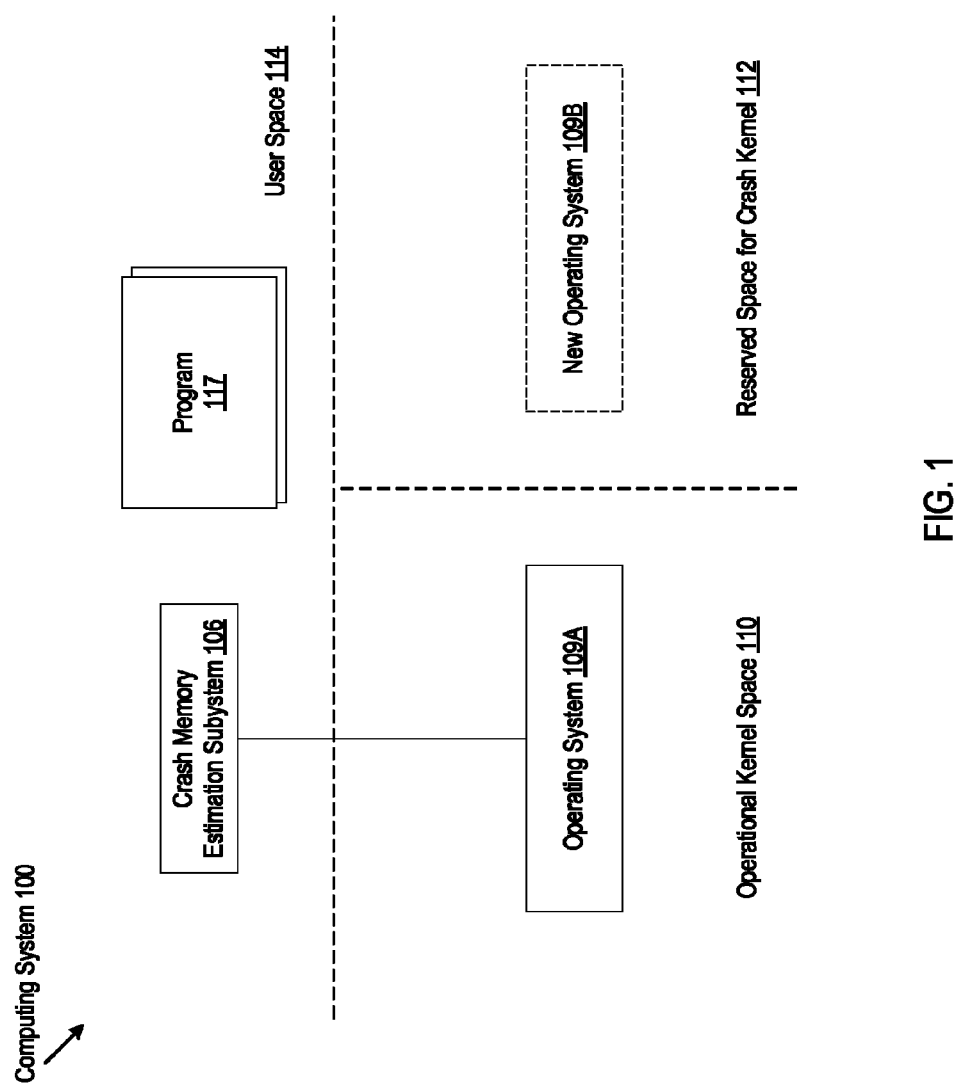
FIG. 1 illustrates an exemplary crash memory estimation subsystem in which embodiments of the present invention may operate.

FIG. 1 is a block diagram of one embodiment of a system 100 that may be part of a computing system such as a client computer (e.g., a personal computer, a laptop, a PDA, a mobile phone, etc.), a server computer, a gateway computer, etc. An exemplary computer system is described in greater detail below in conjunction with FIG. 4. System 100 includes physical memory (main memory), that is mapped to virtual memory, which can be divided into regions, such as user space 114 and kernel space 110. The user space 114 is reserved for user mode programs including user programs 117. The operational kernel space 110 is memory space for running an operating system 109A (e.g., Linux® OS, SELinux OS, Windows® OS, etc.). An operating system 109A,B acts as an interface between a program 117 and the computing system hardware. An operating system 109A,B is responsible for providing essential services within a computer system, such as, the initial loading of programs, file management, and protection facilities. For example, upon a bootup procedure of a computing system, an operating system 109A,B can execute an initialization program/process (init process).

The operational kernel space 110 can also be referred to as a first kernel space. When the operating system 109A in the operational kernel space 110 experiences a system failure, a new operating system 109B can be booted from a second kernel using a reserved memory space 112. The second kernel is also referred to as a crash kernel and/or capture kernel. An operating system 109A,B, such as the Linux® OS, can provide a crash recovery mechanism, known as 'kdump', that boots a crash kernel in a new operating system 109B using a protected region of memory 112. The new operating system 109B can then reinitialize the hardware without modifying the state of the crashed operating system 109A memory. A crash recovery mechanism (e.g., kdump) executes from the new operating system and collects state data for the crashed operating system 109 for post-mortem analysis. The booting of the crash kernel requires, by definition, sufficient amount of memory space, and thus, the operational kernel (also referred to as 'first kernel' and 'first operational kernel') sets aside (reserves) a significant amount of memory 112 for the crash kernel (second kernel). The reserved memory space for the crash kernel 112 is protected from general use (i.e., is not available during normal operation of the operating system 109A in the operational kernel space 110).

Conventional solutions configure the reserved memory space for the crash kernel 112 using estimate memory requirements based on common configurations. Typically, a user, such as a system administrator, decides the amount of memory to reserve for the crash kernel and manually configures the memory space 112 for the crash kernel. A user's estimate of a memory size can be too large and thus, wasteful. A user's estimate of a memory size that is too small leads to the new operating system failing to capture the crash data (crash dump) due to insufficient memory space.

The computing system 100 can include a crash memory estimation subsystem 106 for automatically estimating the amount of kernel memory space 112 to reserve for a crash kernel based on the actual memory usage in the operational kernel space 110. The crash memory estimation subsystem 106 can collect data for the memory usage in the operational kernel space 110 and use the data to generate an estimate of the memory space 112 to reserve for the crash kernel. One embodiment of a crash memory estimation subsystem 106 is described in greater detail below in conjunction with FIG. 2. Examples of memory usage in the operational kernel space 110 can include, and are not limited to, memory usage of device drivers that are initialized in the operational kernel space 110, memory usage of file system modules in the operational kernel space 110, memory usage of the operational kernel, etc. In one embodiment, the crash memory estimation subsystem 106 includes a crash configuration utility to automatically instruct a crash memory reservation subsystem 105 in the kernel space 110 to configure the memory space 112 for the crash kernel using the estimate generated by the crash memory estimation subsystem 106. In one embodiment, the crash memory estimation subsystem 106 notifies a user of the estimate. The crash memory estimation subsystem 106 can continually monitor the memory usage (e.g., memory usage of device drivers, operational kernel, file system modules, etc.) in the operational kernel space 110 for changes and generate a new estimate when the memory usage changes. For example, a new device may be added to the computing system 100, new memory may be allocated, and the crash memory estimation subsystem 106 can generate a new estimate. In one embodiment, the crash memory estimation subsystem 106 notifies a user of the new estimate. In another embodiment, the crash memory estimation subsystem 106 automatically instructs the crash memory reservation subsystem 105 to re-configure the memory space reserved for the crash kernel based on the new estimate. In another embodiment, the crash memory estimation subsystem 106 can perform a combination of notification and automatic reservation of the memory space for the crash kernel.

Figure 2:
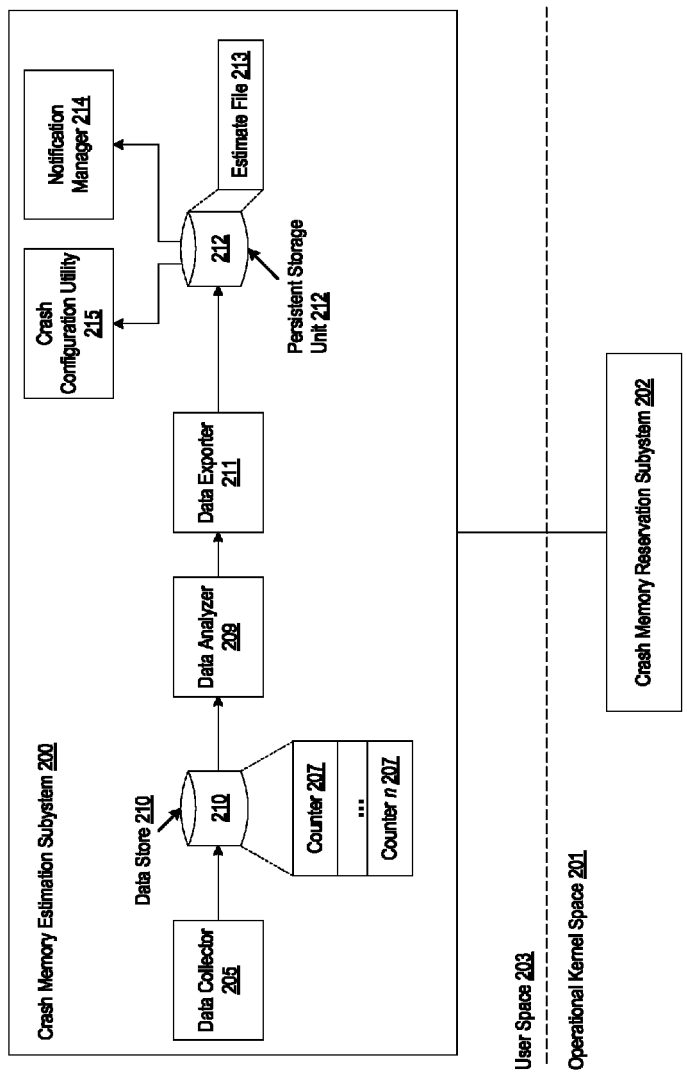
FIG. 2 is a block diagram of one embodiment of a crash memory estimation subsystem for automatically reserving crash memory space for a second kernel based on actual device driver memory usage of a first operational kernel.

FIG. 2 is a block diagram of one embodiment of a crash memory estimation subsystem 200 for automatically estimating the crash memory space for a crash kernel based on actual memory usage of a first operational kernel (e.g., device driver memory usage, operational kernel memory usage, file system module memory usage, etc.). The crash memory estimation subsystem 200 resides in a user space 203 and may be the same as the crash memory estimation subsystem 106 hosted by computing system 100 of FIG. 1.

The crash memory estimation subsystem 200 can include a data collector 205 to export actual memory usage data of memory users in an operational kernel space 201 from the kernel space 201 to the user space 203. Examples of memory users in an operational kernel space 201, can include, and are not limited to device drivers, file system modules, a first operation kernel, etc. An example of the actual memory usage data includes, and is not limited to, the memory usage of the device drivers that are initialized by a first operational kernel, the memory usage of the first operational kernel, the memory usage of file system modules in the first operational kernel, etc. The data collector 205 is an interface which a memory user (e.g., device driver, file system module, etc.) can use (e.g., call) to export the actual memory usage data for the memory user to the user space 203. The data collector 205 can export the actual memory usage data (e.g., for a device driver) via a virtual file system (e.g., proc file system, sysfs file system, etc.). An operating system, such as Linux®, can provide a virtual file system, such as proc file system and sysfs file system, for configuration purposes. The data collector 205 provides a kernel space interface and a user space interface to export data from the kernel space 201 to the user space 203 via the virtual file system. The kernel space interface of the data collector 205 allows a kernel (e.g., first operational kernel) to register data structures for exporting the actual memory usage data to the user space 203, for example, using a symbolic name. An example of a registered data structure for exporting data to the user space 203 is a counter 207. A counter 207 exists persistently through the life of an operating system. For brevity and simplicity, a counter 207 is used as an example throughout this document.

The virtual system user space interface of the data collector 205 exports the data (e.g., actual memory usage data) in the registered data structures (e.g., counters 207) from the kernel space 201 to as data stores 210 (e.g., files) in the user memory space 203. In one embodiment, the data store 210 is a persistent storage unit. A persistent storage unit can be a local storage unit or a remote storage unit. Persistent storage units can be a magnetic storage unit, optical storage unit (e.g., disks), solid state storage unit, electronic storage units (main memory), or similar storage unit. Persistent storage units can be a monolithic device or a distributed set of devices. A 'set', as used herein, refers to any positive whole number of items.

In one embodiment, the data collector 205 creates an instance of a data structure (e.g., counter 207) in the kernel space 201 for each memory user (e.g., device driver, kernel, file system module, etct.) that is using memory in the operational kernel space 201. For example, the operational kernel space 201 initializes fourteen devices and the data collector 205 creates an instance of a counter 207 for each of the fourteen devices. In one embodiment, the data collector 205 creates a data store 210 (e.g., file) in the user space 203 for each data structure (e.g., counter 207) in the kernel space 201. In another embodiment, the data collector 205 creates a single data store 210 (e.g., file) in the user space 203 for all of the data structures (e.g., counters 207) in the kernel space 201.

The data collector 205 reflects changes made to the registered data structures (e.g., counters 207) in the content of the data stores 210 (e.g., files). Memory allocations can change due to various events. For example, a new device may be added to a computing system, an existing device may be removed from a computing system, an operating system may allocate additional memory to a device, an operating system may free memory that was allocated to a device, etc. The data collector 205 can continually update the actual memory usage data in the data store 210 (e.g., files) in real time to reflect any changes made in the memory allocations relating to the operational kernel space 201. For example, when an operating system initializes Device_Driver_1, the data collector 205 creates a data structure (e.g., counter 207) instance, Counter_1, that corresponds to Device_Driver_1 in the kernel space 201 and a corresponding data store 210 (e.g., file), File_1, in the user space 203. When the operating system dynamically allocates 1 kilobyte of memory to Device_Driver_1, the actual memory usage data in Counter_1 indicates 1 kilobyte of memory is allocated to Device_Driver_1. The data collector 205 exports the actual memory usage data in the Counter_1 in the kernel space 201 to the File_1 in the user space 203. Subsequently, if the operating system dynamically allocates additional memory to Device_Driver_1, for example, an additional 2 kilobytes of memory, the actual memory usage data in Counter_1 and the File_1 is updated in real time to indicate 3 kilobytes of memory are currently allocated to Device_Driver_1. If the operating system frees 1 kilobyte of the memory allocated to Device_Driver_1, the actual memory usage data in Counter_1 and File_1 is updated in real time to indicate 2 kilobytes of memory are currently allocated to Device_Driver_1.

The data analzyer 209 generates an estimate of the amount of memory space to reserve for the crash kernel space using the actual memory usage data for the memory users (e.g., device drivers, file system modules, kernel) in the counters 207 that is exported to the data store 210 (e.g., files) in the user space 203. The data analzyer 209 can sample the data stored in the data store 210 (e.g., files) at one or more sampling points and generate the estimate based on the state of the first operational kernel at that particular sampling point. Since the memory allocations can change due to various events and the actual memory usage data in the counters 207 and the data stores 210 (e.g., files) can change, in a preferred embodiment, the data analyzer 215 samples the data store 210 (e.g., files) at a point in time when the currently running operating system is in a state that closely resembles an expected running state of a copy of the operating system (e.g., a new operating system to be executed in a crash kernel space) that recovers a crash dump. In the preferred embodiment, the sampling point is an accurate representation of how much memory is needed to ensure that the crash kernel can effectively capture a crash dump without reserving too much memory for the crash kernel.

In one embodiment, the sampling point is set for during system boot up and is prior to any programs running in the user space 203. In one embodiment, a system boot up includes two phases, a first phase of executing a temporary file system that is followed by a second phase of mounting of a root file system. An example of a temporary file system that is executing before the system root file system is mounted includes, and is not limited to, an initramfs file system.

The sampling point can be user-defined by a script. For example, a user can configure the crash memory reservation subsystem to sample the data during execution of a temporary file system script (e.g., initramfs script) and prior to mounting a root file system. Another example of a sampling point that occurs during system boot up and subsequent to mounting the root file system can include, and is not limited to, a sampling point set for during execution of an init startup script on the root file system. During system boot, when the root file system is mounted, a number of init start up scripts can be executed, such as sysinit script, rcinit startup script, etc.

In another embodiment, the sampling point occurs subsequent to system boot up, such as during execution of a script (e.g., udev script) from the user space 203. A script executing in the user space 203 can trigger the data analyzer 209 to sample the actual memory usage data in the counters 207 that is exported to the data store 210 (e.g., files). For example, subsequent to system boot up, a user unplugs a device from the computing system. A script (e.g., udev script) which is executing in the user space 203 detects an unplug event and triggers the data analyzer 209 to sample the actual memory usage data in the data stores 210 (e.g., files) in response to the unplug event. In another example, subsequent to system boot up, a user adds a device to the system. A script executing in the user space 203 detects a device detection event and triggers the data analyzer 209 to sample the actual memory usage data in the data stores 210 (e.g., files) in response to the device detection event.

In one embodiment, the data analyzer 209 samples the data in the data stores 210 (e.g., files) and calculates the estimate as a sum of the actual memory usage data for the all of the device drivers that are loaded by the first operational kernel. In one embodiment, the data analyzer 209 can add a user-defined value to the sum to generate the estimate. The user-defined value can be a representation of memory usage of the first operational kernel, for example, 64 Mb. The user-defined value can be stored as a parameter in the persistent storage unit 210.

Typically, a crash kernel (second kernel) initializes the same number of device drivers that are initialized in the first operational kernel. A user can use a user space utility to provide input of a configuration of the crash kernel (also referred to as a 'dump target user configuration data.'). The user space utility can store the dump target user configuration data in a data store. The dump target user configuration data can include data that indicates which devices are to be loaded by a new operating system when the first operating system crashes. In some cases, a user configures the crash kernel to initialize a number of devices that is less than the number of devices drivers that are initialized in the first operational kernel. For example, the first operational kernel initializes fourteen device drivers and a user configures the crash kernel to load ten of the fourteen device drivers. In one embodiment, the data analyzer 209 can determine from the dump target configuration data which of the device drivers that are initialized by the first operational kernel are to be loaded by the crash kernel and calculate the estimate using a sum of the actual memory usage data that corresponds to the device drivers that are to be loaded by the crash kernel. The data analyzer 209 can add the user-defined value to the sum of the actual memory usage data that corresponds to the device drivers that are to be loaded by the crash kernel to generate the estimate.

The data exporter 211 can create an estimate file 213 for storing the estimate. The data exporter 211 can export the estimate file 213 to the user space 203 to allow the estimate file 213 to be accessed by a user space program, such as a crash configuration utility 215 for automatically reserving the memory space for the crash kernel. In one example, the estimate file 213 is a virtual file in a temporary file system. In another example, the estimate file 213 is a regular file in a regular file system. When the data analyzer 209 samples the actual memory usage data from the counters 207 that is exported to the data stores 210 (e.g., files) during execution of a temporary file system (e.g., initramfs) and prior to the mounting of the root file system, the data exporter 211 creates a virtual file (e.g., estimate file 213) in the initramfs file system and stores the estimate in the virtual file in the initramfs file system. When the data analyzer 209 samples the actual memory usage data from the data stores 210 (e.g., files) subsequent to the mounting of the root file system, such as during execution of an init startup script on the root file system (e.g., sysinit script, rcinit startup script), the data exporter 211 creates a regular file (e.g., estimate file 213) in the root file system and stores the estimate in the regular file in the root file system.

In one embodiment, the crash memory estimation subsystem 200 includes a crash configuration utility 215 in the user space 203 to automatically reserve the memory space for the crash kernel using the estimate in the estimate file 213. The crash configuration utility 215 can execute a script to read the data stored in the estimate file 213 (e.g., virtual file in initramfs file system, file in the root file system) and use the data to configure the memory space for the crash kernel via the crash memory reservation subsystem 202. The crash memory reservation subsystem 202 is a kernel component that reserves the memory space for the crash kernel as triggered by the crash configuration utility 215. Examples of scripts to read the data stored in the estimate file 213 can include, and are not limited to, sysinit scripts, user scripts, etc. For example, the crash configuration utility 215 can execute a sysinit script during system boot to read the estimate in the virtual file in the initramfs file system and cause the crash memory reservation subsystem 202 to modify the kernel command line to reserve the memory space for the crash kernel. In another example, the crash configuration utility 215 can execute a user script subsequent to system boot to read the estimate in the virtual file in the initramfs file system or the file in the root file system and cause the crash memory reservation subsystem 202 to modify the kernel command line to reserve the crash kernel memory space.

In one embodiment, the crash memory estimation subsystem 200 does not automatically reserve the memory space for the crash kernel when the estimate is generated. In one example, the data exporter 211 modifies a boot loader file such that during a subsequent system boot, the memory space for the crash kernel can be reserved based on the estimate in the estimate file 213. In another example, the crash memory estimation subsystem 200 notifies a user of the memory space to be reserved. The crash memory estimation subsystem 200 can include a notification manager 214 that can send a notification of the estimate (e.g., initial estimate, updated estimate) to a user device (e.g., a personal computer, a laptop, a PDA, a mobile phone, etc.). For instance, when the data analyzer 209 generates the estimate, the notification manager 214 can generate and display on a display device of a user device a notification including the estimate in the estimate file 213. Examples of a notification can include, and are not limited to, messages communicated over a network (e.g., email messages, text messages, instant messages, social network messages, etc.), visual/sound alarm indicators on a computer system (e.g., computing system 100 in FIG. 1), etc. In one embodiment, the notification manager 214 compares the estimate to the current amount of memory that is reserved for the crash kernel and notifies a user via a user device when there is not enough memory space reserved. For instance, when the data analyzer 209 generates the estimate, the notification manager 214 can generate and display on a display device of a user device a warning that there is not enough memory reserved for the crash kernel.

In one embodiment, when the crash memory estimation subsystem 200 detects a change in the memory usage for the operational kernel space (e.g., device removed, device added) and updates the actual memory usage data stored in the counters 207 and exports the updated data in the counters 207 to the data stores 210 (e.g., files). The data analyzer 209 is triggered to obtain the updated data in the data store 210 (e.g., files) and generate a new estimate to reflect the changed memory usage data. The data exporter 211 can update the estimate file 213 with the new estimate. In one embodiment, the crash configuration utility 215 can automatically re-configure the reserved memory space for the crash kernel based on the new estimate via the crash memory reservation subsystem 202. In one embodiment, the data exporter 211 modifies a script (e.g., a boot loader file) such that during a subsequent system boot, the memory space for the crash kernel can be reserved based on the new estimate in the estimate file 213. In one embodiment, the crash memory estimation subsystem 200 notifies a user of the new estimate of the memory space to reserve for the crash kernel.

Figure 3:
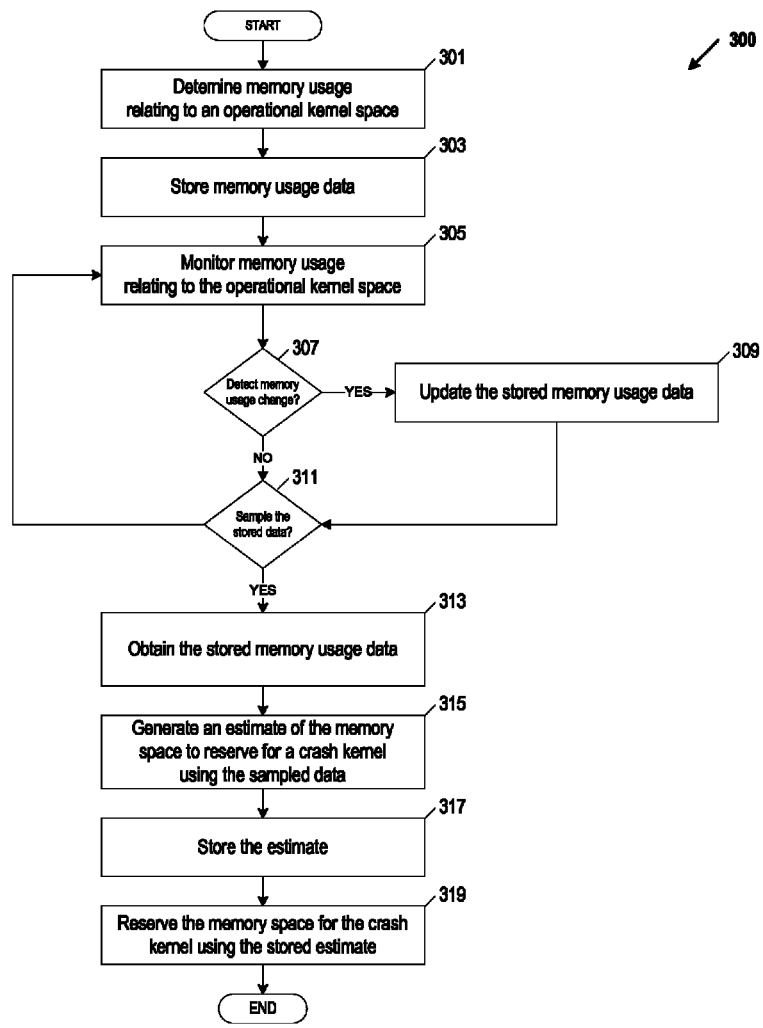
FIG. 3 is a flow diagram of an embodiment of a method for automatically estimating crash memory space for a second kernel based on actual device driver memory usage of a first operational kernel.

FIG. 3 is a flow diagram of an embodiment of a method 300 for automatically estimating crash memory space for a crash kernel based on actual device driver memory usage of a first operational kernel. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the crash memory estimation subsystem 106 hosted by a computing system 100 of FIG. 1.

At block 301, the crash memory estimation subsystem determines the memory usage relating to memory users in an operational kernel space. Examples of memory users include, and are not limited to, the device drivers that are initialized by a first operational kernel into the operational kernel space, file system modules, the first operational kernel, etc. Another example of memory usage that is determined by the crash memory system includes, and is not limited to, slab allocation, which is a representation of the memory usage of the first operational kernel and all of the device drivers initialized in the first operational kernel.

The crash memory estimation subsystem includes an interface that allows the kernel to register data structures (e.g., a counter) and store the actual memory usage data of the memory users (e.g., device drivers, file system modules, first operational kernel, etc.) in the registered data structures (e.g., counters) in a kernel space. In one embodiment, there is one data structure (e.g., counter) per memory user (e.g., device diver, file system module, kernel). At block 303, the crash memory estimation subsystem exports the actual memory usage data of the memory users from the registered data structures (e.g., a counters) in the kernel space to the user memory space and stores the actual memory usage data in data stores (e.g., files) in the user memory space. In one embodiment, there is one data store (e.g., file) per memory user (e.g., device diver, file system module, kernel). For example, the crash memory estimation subsystem determines that there are fourteen devices that are initialized by the first operational kernel at block 301, creates an instance of a counter in the virtual file system (e.g., sysfs) for each of the fourteen devices, exports the data in the counters to the user space and stores the actual memory usage data for the devices in files in the user space for each of the fourteen devices at block 303.

At block 305, the crash memory estimation subsystem monitors the memory usage relating to the operational kernel space. Memory allocations in the operational kernel space can dynamically change. For example, subsequent to a system boot up, a device can be removed or added from the system. In addition, the first operational kernel may subsequently allocate additional memory to an existing device and/or free memory that is currently allocated to an existing device.

At block 307, the crash memory estimation subsystem determines whether there is a change in the memory usage in the operational kernel space. The crash memory estimation subsystem can detect an event (e.g., new device, unplugged device, etc.) to determine whether there is a change. If there is a change in the memory usage, the crash memory estimation subsystem updates the memory usage data (e.g., that is stored in the counters) and exports the updated data to data stores (e.g., files) in the user space to reflect the change at block 309. For example, the first operational kernel initially allocated 1 kilobyte of memory to Device_Driver_1, and the crash memory estimation subsystem stored actual memory usage data in Counter_1 reflecting the 1 kilobyte of memory in the kernel. The crash memory estimation subsystem exports the data in the Counter_1 to File_1 in the user space. Subsequently, the first operational kernel allocates an additional 2 kilobytes of memory to Device_Driver_1, and the crash memory estimation subsystem detects the change at block 307 and updates Counter_1 in the kernel space to reflect that 3 kilobytes of memory are currently allocated to Device-_Driver_1, and exports the updated data to the File_1 in the user space at block 309.

If there is not a change in the memory usage in the first operational kernel (block 307), the crash memory estimation subsystem determines whether to sample the memory usage data, which is stored in the counters and exported to the files in the user space, at block 311. The memory usage data that is stored in the files in the user space can be sampled at one or more sampling points. In a preferred embodiment, the sampling point is set for during system boot up and prior to any programs running in the user space. The sampling point can be user-defined in a script. For example, a user can configure the crash memory estimation subsystem to sample the data during execution of a temporary file system script (e.g., initramfs script) and prior to mounting a root file system. Another example of sampling point is subsequent to the mounting of the root file system, such as during execution of an init startup script on the root file system (e.g., sysinit script, rcinit startup script).

In another embodiment, the sampling point is subsequent to system boot up, such as during execution of a script (e.g., udev script) from the user space. A script executing in the user space can trigger the crash memory estimation subsystem to sample the actual memory usage data in the files in the user space, for example, when a user unplugs a device from the system.

If the data is not to be sampled (block 311), the crash memory estimation subsystem returns to monitoring the memory usage for the first operational kernel at block 305. If the data is to be sampled, the crash memory estimation subsystem obtains the memory usage data in the files in the user space at block 313 and generates an estimate of the memory space to reserve for the crash kernel using the sampled data at block 315. In one embodiment, the crash memory estimation subsystem calculates the estimate as a sum of the actual memory usage data for the device drivers that are loaded by the first operational kernel. The crash memory estimation subsystem can add a user-defined value to the sum to generate the estimate. The user-defined value can be a representation of memory usage of the first operational kernel, for example, 64 Mb.

In another embodiment, the crash memory estimation subsystem can determine which of the device drivers are to be loaded by the crash kernel and calculate the estimate using a sum of the actual memory usage data that corresponds to the device drivers that are to be loaded by the crash kernel. The crash memory estimation subsystem can determine which of the device drivers are to be loaded by the crash kernel from dump target configuration data that is stored in a data store that is coupled to the crash memory estimation subsystem. A user space utility can receive user input specifying a configuration for the crash kernel. The user input can be stored as dump target user configuration data. For example, the first operational kernel initializes fourteen device drivers and the dump target user configuration data specifies that the crash kernel is configured to load ten of the fourteen device drivers. The crash memory estimation subsystem accesses the dump target user configuration data to determine that the crash kernel is to load ten devices and calculates the estimate using a sum of the actual memory usage data that corresponds to the ten device drivers that are to be loaded by the crash kernel.

At block 317, the crash memory estimation subsystem stores the estimate of the memory space to reserve for the crash kernel. When the crash memory estimation subsystem samples the actual memory usage data from the files in the user space during execution of a temporary file system (e.g., initramfs) and prior to mounting a root file system, the crash memory estimation subsystem creates a virtual file in the initramfs file system and stores the estimate in the virtual file in the initramfs file system. When the crash memory estimation subsystem samples the actual memory usage data from the files in the user space subsequent to the mounting of the root file system, such as during execution of an init startup script on the root file system (e.g., sysinit script, rcinit startup script), the crash memory estimation subsystem creates a file in the root file system and stores the estimate in the file in the root file system.

In one embodiment, at block 319, the crash memory estimation subsystem automatically reserves the memory space for the crash kernel. The crash memory estimation subsystem can execute a script to read the data (e.g., estimate) in the file (e.g., virtual file in initramfs file system, file in the root file system) and use the data to cause a crash memory reservation subsystem (e.g., crash memory reservation subsystem 202 in FIG. 2) to configure the memory space for the crash kernel. For example, the crash memory estimation subsystem can execute a sysinit script during system boot to read the estimate in the virtual file in the initramfs file system and cause a a crash memory reservation subsystem to modify the kernel command line to reserve the memory space for the crash kernel. In another example, the crash memory estimation subsystem can execute a sysinit script during system boot to read the estimate in a regular file in the root file system and cause a crash memory reservation subsystem to modify the kernel command line to configure the memory space for the crash kernel. In another example, the crash memory estimation subsystem can execute a user script subsequent to system boot to read the estimate in the virtual file in the initramfs file system or the file in the root file system and cause a crash memory reservation subsystem to modify the kernel command line to reserve the crash kernel memory space.

In one embodiment, the crash memory estimation subsystem does not automatically reserve the memory space for the crash kernel when the estimate is generated. In one example, the crash memory estimation subsystem modifies a boot loader file such that during a subsequent system boot, the memory space for the crash kernel can be reserved based on the estimate. In another example, the crash memory estimation subsystem sends a notification of the estimate (e.g., initial estimate, updated estimate) to a user. Examples of a notification can include, and are not limited to, messages communicated over a network (e.g., email messages, text messages, instant messages, social network messages, etc.), visual/sound alarm indicators on a computer system (e.g., computing system 100 in FIG. 1), etc. The crash memory estimation subsystem can compare the estimate to the current amount of memory that is reserved for the crash kernel and notify a user when there is not enough memory space that is reserved. For instance, the crash memory estimation subsystem can generate and display on a display device a warning that there is not enough memory reserved for the crash kernel.

In one embodiment, the crash memory estimation subsystem returns to block 305 to continue monitoring memory usage relating to the first operational kernel to determine whether there is a change in the memory usage. The crash memory estimation subsystem is a dynamic system that can detect a change (e.g., removed device, new device, freed memory, additional memory allocation, etc.) in memory usage relating to the first operational kernel, generate a new estimate, notify a user of the new estimate, and update the memory space that is reserved for the crash kernel based on the new estimate.

Figure 4:
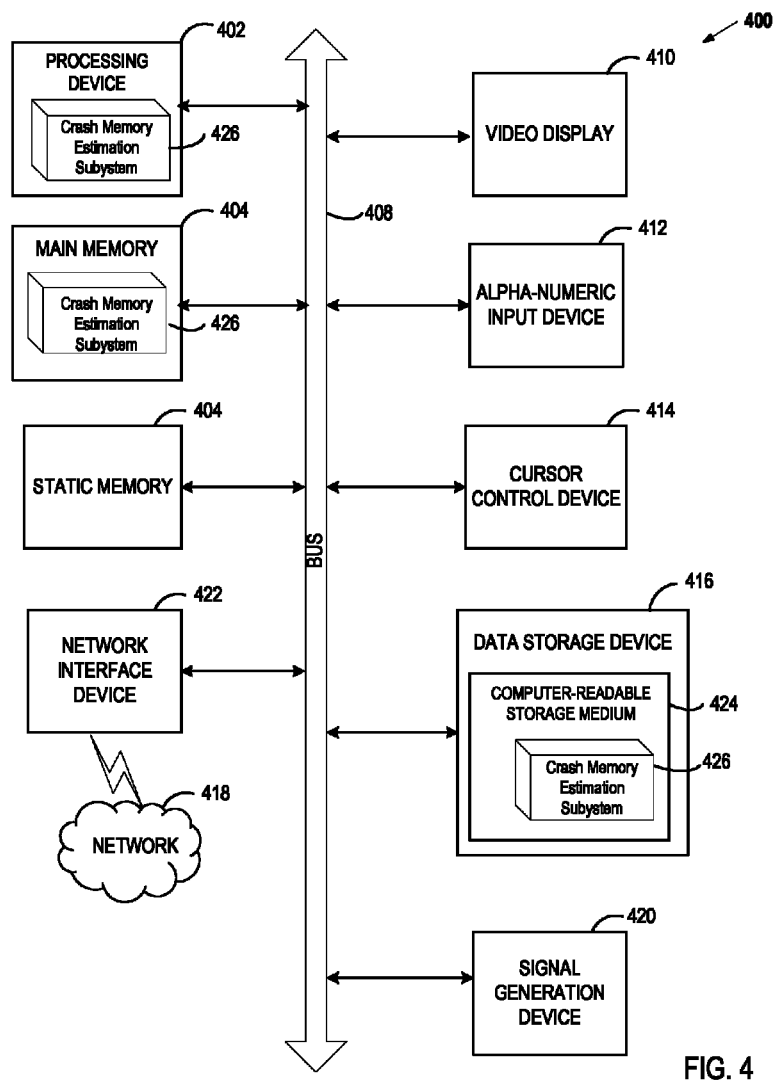
FIG. 4 is a diagram of one embodiment of a computer system for automatically estimating crash memory space for a second kernel based on actual device driver memory usage of a first operational kernel.

FIG. 4 is a diagram of one embodiment of a computer system for automatically reserving crash memory space for a crash kernel based on actual device driver memory usage of a first operational kernel. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a secondary memory 416 (e.g., a data storage device in the form of a drive unit, which may include fixed or removable computer-readable storage medium), which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the crash memory estimation subsystem 426 for performing the operations and steps discussed herein.

The computer system 400 may further include a network interface device 422. The computer system 400 also may include a video display unit 410 (e.g., a liquid crystal display (LCD) or a cathode ray tube (CRT) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions (e.g., the crash memory estimation subsystem 426) embodying any one or more of the methodologies or functions described herein. The crash memory estimation subsystem 426 may also reside, completely or at least partially, within the main memory 404 and/or within the processing device 402 during execution thereof by the computer system 400, the main memory 404 and the processing device 402 also constituting machine-readable storage media. The crash memory estimation subsystem 426 may further be transmitted or received over a network 418 via the network interface device 422.

The computer-readable storage medium 424 may also be used to store the crash memory estimation subsystem 426 persistently. While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The crash memory estimation subsystem 426, components and other features described herein (for example in relation to FIG. 1) can be implemented as discrete hardware components or integrated in the functionality of hardware components such as ASICs, FPGAs, DSPs or similar devices. In addition, the crash memory estimation subsystem 426 can be implemented as firmware or functional circuitry within hardware devices. Further, the crash memory estimation subsystem 426 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "storing," "generating," "reserving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for automatically reserving crash memory space for a crash kernel based on actual device driver memory usage of a first operational kernel. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    storing, by a processor, actual memory usage data in a user memory space, the actual memory usage data representing memory usage of a plurality of device drivers that are loaded by a first kernel;
    generating, by the processor, an estimate of memory space to be reserved for a second kernel in view of the actual memory usage data for the plurality of device drivers that are loaded by the first kernel, the actual memory usage data stored in the user memory space by the first kernel at a sampling point set during system boot up with the first kernel and prior to execution of user programs in the user memory space; and
    reserving, by the processor, memory space for the second kernel using the estimate.

2. The method of claim 1, further comprising:
    detecting a change in the memory usage for at least one of the plurality of device drivers that are loaded by the first kernel;
    updating the actual memory usage data that is stored in the user memory space;
    generating an updated estimate of the memory space for the second kernel based on the updated actual memory usage data; and
    changing the memory space that is reserved for the second kernel using the updated estimate.

3. The method of claim 1, wherein storing the actual memory usage data comprises:
    storing the actual memory usage data for each of the plurality of device drivers that are loaded by the first kernel in counters in a first kernel space; and
    exporting the actual memory usage data in the counters in the first kernel space to data stores in the user memory space.

4. The method of claim 1, wherein generating the estimate of the memory space for the second kernel comprises:
    receiving the actual memory usage data that is stored in the user memory space by the first kernel at a second sampling point, wherein the second sampling point is set during execution of a temporary file system and prior to mounting a root file system by the first kernel.

5. The method of claim 1, wherein generating the estimate of the memory space for the second kernel comprises:

receiving the actual memory usage data that is stored in the user memory space by the first kernel at a second sampling point, wherein the second sampling is set subsequent to mounting a root file system by the first kernel.

6. The method of claim 1, wherein generating the estimate of the memory space for a second kernel comprises:
calculating the estimate as a sum of the actual memory usage data for the plurality of device drivers that are loaded by the first kernel.

7. The method of claim 6, further comprising:
adding a user-defined value to the sum to generate the estimate, the user-defined value being a representation of memory usage of the first kernel.

8. The method of claim 1, wherein generating the estimate of the memory usage for the second kernel comprises:
determining which of the plurality of device drivers is to be loaded by the second kernel; and
calculating the estimate using a sum of the actual memory usage data that corresponds to the device drivers that are to be loaded by the second kernel.

9. A system comprising:
a data store to store actual memory usage data for a plurality of device drivers that are loaded by a first kernel, wherein the actual memory usage data represents memory usage for the plurality of device drivers; and
a processor coupled to the data store to generate an estimate of memory space to be reserved for a second kernel in view of the actual memory usage data stored in the data store, the actual memory usage data stored in the user memory space by the first kernel at a sampling point set during system boot up with the first kernel and prior to execution of user programs in the user memory space, and
to reserve the memory space for the second kernel using the estimate.

10. The system of claim 9, further comprising the processor:
to detect a change in the memory usage for at least one of the plurality of device drivers that are loaded by the first kernel;
to update the actual memory usage data stored in the data store;
to generate an updated estimate of the memory space for the second kernel based on the updated actual memory usage data; and
to change the memory space that is reserved for the second kernel using the updated estimate.

11. The system of claim 9, further comprising:
memory comprising counters to store the actual memory usage data in a first kernel space; and
the processor to export the actual memory usage data that is stored in the counters in the first kernel space to the data store, the data store residing in a user memory space.

12. The system of claim 9, wherein the processor to generate the estimate of the memory space for the second kernel comprises the processor:
to receive the actual memory usage data that is stored in the data store by the first kernel at a second sampling point, wherein the second sampling is set during execution of a temporary file system and prior to mounting a root file system by the first kernel.

13. The system of claim 9, wherein the processor to generate the estimate of the memory space for the second kernel comprises the processor:
receiving the actual memory usage data that is stored in the data store by the first kernel at a second sampling point, wherein the second sampling point is set subsequent to mounting a root file system by the first kernel.

14. The system of claim 9, wherein the processor to generate the estimate of the memory space to be reserved for a second kernel comprises the processor:
to calculate the estimate as a sum of the actual memory usage data for the plurality of device drivers that are loaded by the first kernel.

15. The system of claim 14, further comprising the processor:
to add a user-defined value to the sum to generate the estimate, the user-defined value being a representation of memory usage of the first kernel.

16. The system of claim 9, wherein the processor to generate the estimate of memory usage for the second kernel comprises the processor:
to determine which of the plurality of device drivers is to be loaded by the second kernel;
to calculate the estimate using a sum of the actual memory usage data that corresponds to the device drivers that are to be loaded by the second kernel.

17. A non-transitory computer-readable storage medium including instructions that, when executed by a processor, cause the processor to perform a set of operations comprising:
storing, by the processor, actual memory usage data in a user memory space, the actual memory usage data representing memory usage of a plurality of device drivers that are loaded by a first kernel;
generating, by the processor, an estimate of memory space to be reserved for a second kernel in view of the actual memory usage data for the plurality of device drivers that are loaded by the first kernel, the actual memory usage data stored in the user memory space by the first kernel at a sampling point set during system boot up with the first kernel and prior to execution of user programs in the user memory space; and
reserving memory space for the second kernel using the estimate.

18. The non-transitory computer-readable storage medium of claim 17, further comprising:
detecting a change in the memory usage for at least one of the plurality of device drivers that are loaded by the first kernel;
updating the actual memory usage data that is stored in the user memory space;
generating an updated estimate of the memory space for the second kernel based on the updated actual memory usage data; and
changing the memory space that is reserved for the second kernel using the updated estimate.

19. The non-transitory computer-readable storage medium of claim 17, wherein storing the actual memory usage data comprises:
storing the actual memory usage data for each of the plurality of device drivers that are loaded by the first kernel in counters in a first kernel space; and
exporting the actual memory usage data in the counters in the first kernel space to data stores in the user memory space.

20. The non-transitory computer-readable storage medium of claim 17, wherein generating the estimate of the memory space for the second kernel comprises:
calculating the estimate as a sum of the actual memory usage data for the plurality of device drivers that are loaded by the first kernel; and adding a user-defined value to the sum to generate the estimate, the user-defined value being a representation of memory usage of the first kernel.

\* \* \* \* \*